United States Patent

[11] 3,627,323

| [72] | Inventors | Daniel J. Bozich;<br>Charles E. Deckard, both of Huntsville, Ala. |
|---|---|---|
| [21] | Appl. No. | 860,933 |
| [22] | Filed | Sept. 25, 1969 |
| [45] | Patented | Dec. 14, 1971 |
| [73] | Assignee | Wyle Laboratories<br>El Segundo, Calif. |

[54] HIT DETECTION SHOCK SYSTEM
8 Claims, 3 Drawing Figs.

[52] U.S. Cl. .................................................... 273/102.2 S, 35/25
[51] Int. Cl. .................................................... F41j 5/00
[50] Field of Search ........................................... 273/102.2, 102.2 B, 102.2 S; 235/92; 340/323; 35/25

[56] References Cited
UNITED STATES PATENTS

| 2,945,624 | 7/1960 | Nicolaus | 340/323 |
| 2,968,877 | 1/1961 | Becher | 35/25 |

OTHER REFERENCES
Popular Mechanics 4/43 p. 5

*Primary Examiner*—Richard C. Pinkham
*Assistant Examiner*—Marvin Siskind
*Attorneys*—Samuel Lindenberg and Arthur Freilich ABSTRACT: A hit detection system comprising energy-sensitive detectors arranged in an array over a target area of interest. Each detector is connected to a separate amplifier whose output is connected to the input stage of a separate shift register through a threshold circuit. The shift registers are clocked simultaneously by clock pulses from a synchronized clock, the clock pulse period being a function of the time required for energy to traverse a distance which equals the dimension of a hit location area of interest. For each hit location area of interest an AND gate is included. The inputs of each gate are connected to selected stages of the shift register so that only when an impact occurs in the hit location area, associated with the gate, does the latter provide a hit-indicating output.

PATENTED DEC 14 1971

INVENTORS
DANIEL J. BOZICH
CHARLES E. DECKARD
BY Lindenberg & Freilich

ATTORNEYS

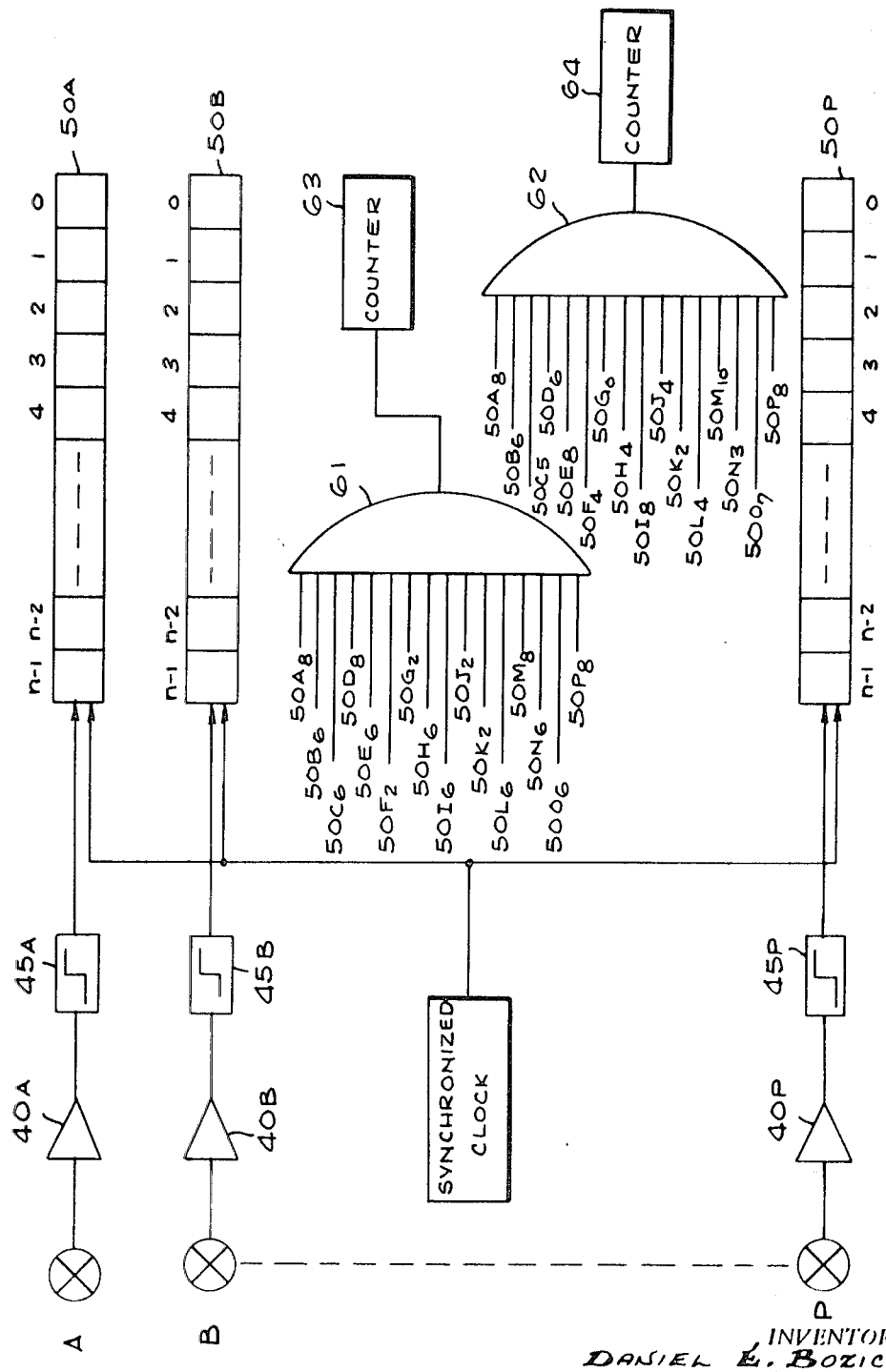

3,627,323

HIT DETECTION SHOCK SYSTEM

BACKGROUND OF THE INVENTION

1. Field of the Invention

The present invention generally relates to a pattern recognition system and, more particularly, to a system for detecting the locations of sources of energy in a defined area, such as the points of impacts of projectiles, or the like, in a defined target area.

2. Description of the Prior Art

There are applications in which it is desirable or necessary to determine the locations of sources of energy in a fixed area. On e example of such an application is in the training of personnel to fire a weapon aboard an airborne vehicle, such as an aircraft or helicopter, at ground targets. In order to determine the trainee'degree of proficiency it is necessary to accurately assess any hit pattern produced by him, when firing at objects on a ground target area.

When training a helicopter pilot to fire a high-rate-of-fire weapon on a target from the helicopter a probability exists that several projectiles may hit the target area simultaneously. Single and dual impacts are the most probable, while the simultaneous impacts of more than two projectiles is less likely. Even when simultaneous hits occur, the likelihood that they will impact the exact same location is small. However, they will occur in close physical proximity to each other. Thus, any accurate hit detection system must be capable of discriminating between impacting projectiles over the target area in both space and time.

Herebefore, most prior art systems were directed to pattern recognition applications in which only stationary patterns were considered. Therefore, such prior art systems, are not satisfactory for the detection of hits over a target area where the hits must be discriminated in both space and time. A need therefore exists for a system capable of detecting a hit pattern based on hit discrimination, both in space and time. Regarding the impact of each projectile as a source which generates energy which radiates outwardly from the point of impact, a need exists for a system which is capable of detecting the locations of sources of energy in a defined area.

OBJECTS AND SUMMARY OF THE INVENTION

It is a primary object of the invention to provide a new hit pattern detection system.

Another object of the invention is to provide a reliable system for detecting the locations of sources of energy in a defined area.

A further object is to provide a novel hit pattern detection system which is discriminatory in both space and time.

Still a further object is to provide a new hit detection system which finds particular use in the accurate determination of hit patterns produced by pilots, who fire projectiles at a specified target area from a weapon on a helicopter, or the like.

These and other objects of the invention are achieved by providing an array of energy-sensitive detectors which covers the area of interest. The outputs of the detectors are connected to the inputs of discriminators, each of which is weighted to respond to a particular pattern in a space/time dependency. Alternately stated, each discriminator is associated with a different point or incremental area in the overall area of interest. The discriminator is weighted so that only when energy, produced at the particular point, arrives at the various detectors in a specific time relationship does the discriminator produce an output, indicating the presence of a source of energy, such as the impact of a projectile at the particular location with which it is associated.

Briefly, the output of each detector is amplified and the amplified signal, when exceeding a selected threshold level, is supplied to an input stage of a shift register which is associated with the detector. The contents of all of the shift registers are shifted by a clocking circuit which is periodically synchronized with the speed of propagation of energy in the area of interest. For each point or incremental area, the system includes an AND gate whose inputs are connected to specific stages of the various shift registers. The stages are chosen so that if a projectile impacts the particular incremental area, associated with the AND gate, all the inputs of the gate are true, enabling the gate to produce a hit-indicating output.

The novel features of the invention are set forth with particularity in the appended claims. The invention will best be understood from the following description when read in conjunction with the accompanying drawings.

BRIEF DESCRIPTION OF THE DRAWINGS

FIG. 3 is a block diagram of an embodiment of the present invention.

DESCRIPTION OF THE PREFERRED EMBODIMENTS

The teachings of the present invention may best be explained in connection with a system for detecting and scoring the locations of projectile impacts in a target area. However, as will become apparent, the teachings are applicable to detecting the locations of energy sources in a defined area, where the starts of the energy radiation from these sources are spaced in time. Thus, the following description should be regarded as one example of an application of the invention, rather than as a limitation thereon.

Figure 1:
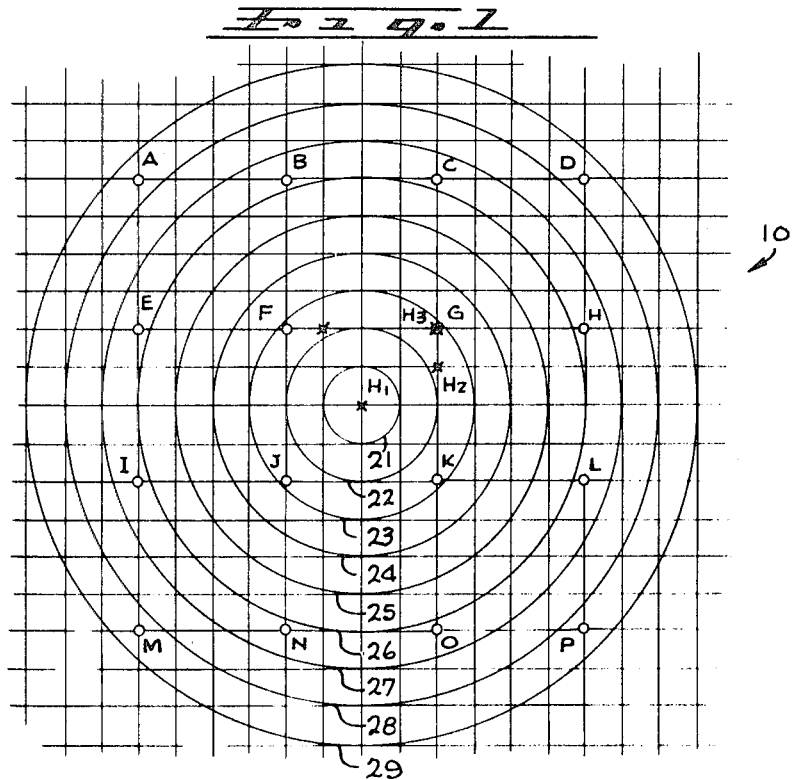
FIG. 1 is a simple diagram of an array of detectors in a target area.

Reference is now made to FIG. 1 wherein numeral 10 designates a defined target area to which projectiles from a helicopter-mounted weapon are assumed to be directed. The target area is defined by an array of energy detectors or transducers identified by A through P. As shown, the detectors are regularly spaced in the array. The area covered by these detectors may be thought of as being divided into a grid which includes 16 small squares within each large square, defined by four adjacent detectors, such as F, G, J and K. Each of these small squares or any area equivalent thereto may be regarded as a finite hit location. The present invention is directed to the detection and the scoring of the number of hits at each one of these hit locations.

The impact of any projectile with center, the energy from this ground within the target area is assumed to act as a source from which energy radiates outwardly through the ground and is sensed by each of the detectors. Clearly, in response to each impact the relative times of arrival of the energy at the various detectors are a function of the impact location in the target area. In FIG. 1 the three small $x$'s designated H1–H3 represent three different projectile impacts or hits. From this figure it is apparent that since hit H1 is at the array center, the energy from this hit arrives at detectors F, G, J and K at the same time. At some later time energy arrives at detectors B, C, E, H, I, L, N and O, all of which are equidistant from H1, while at still a later time energy arrives at detectors A, D, M and P. Thus, the detection of the location of H1 may be determined by the relative times of arrival of the energy at the various detectors.

In FIG. 1, numerals 21–29 designates concentric circles, centered about the array center. Let the radius of circle 21 represent a distance on the ground which the energy travels in 1 millisecond (msec.), and let the difference between the radii of any adjacent circles represent such a distance. Therefrom, it becomes apparent that the energy from H1 will arrive at each of the detectors F, G, J and K after 2 msec. and before 3 msec. have elapsed, while the arrival of energy at each of detectors B, C, E, H, I, L, N and O will occur after about 8.5 msec. Each of detectors A, D, M and P will sense the energy at 8.5 msec. after the impact.

Figure 2:
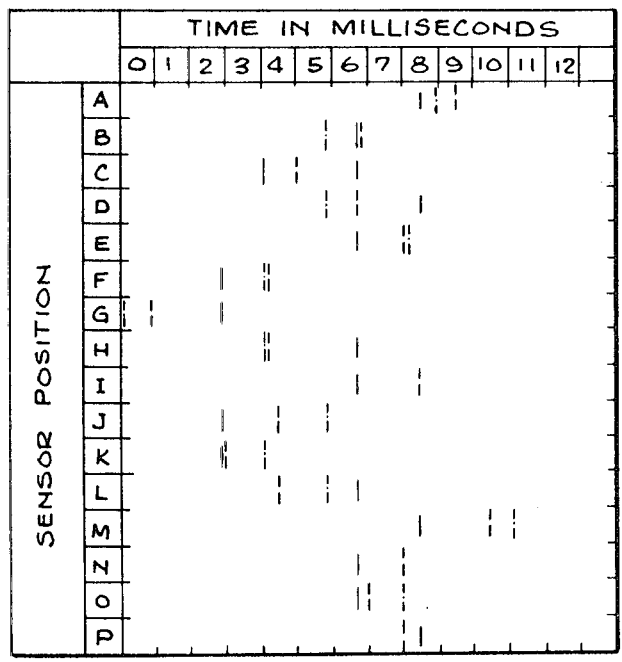
FIG. 2 is a chart useful in explaining the arrival times of energy at the various detectors as a result of impacts, shown in FIG. 1.

The times of arrival of the energy at the various detectors in response to H1 are represented in FIG. 2 which is in chart form by the solid bold lines. The dashed lines represent the time of arrivals of the energy at the various detectors in response to hit H2, while the dash-dot-dash lines designate the energy arrival times in response to hit H3. It should be pointed out that energy may be received at a single detector location as a result of two successive impacts, at different locations. However, for any given location there exists a unique pattern of times of arrival of energy at the array of detectors. It is these patterns that the present invention detects in order to discriminate the hit locations.

As shown in FIG. 3, to which reference is now made, in accordance with the teachings of the present invention each detector, such as A, has associated therewith an amplifier 40, a threshold detector 45 and a multistage shift register 50 whose stages are designated 0 through $n-1$. The three circuits are identified by the detector's letter designation, such as 40A, 45A and 50A. The output of the detector is amplified by the amplifier and amplified output is clocked into the input stage, $n-1$ of the shift register as a true level, hereafter referred to as a binary one (1), only if its amplitude or level equals the threshold level, defined by the threshold detector.

For simplicity only, the amplifiers, threshold detectors and shift registers associated with detectors A, B and P are shown in FIG. 3. The contents of the shift registers are shifted by clocking the registers with clock pulses from a clock 55. Preferably, the clock 55 is periodically synchronized with the speed of energy in the target area soil by automatically measuring the speed of sound in the soil This is necessary to insure that the pulse time-of-arrival patterns are invariant. Alternately stated, the clock 55 is periodically synchronized so that regardless of the time of measurement each clock pulse period corresponds to a fixed distance on the ground.

For each hit location in the target area, represented in FIG. 1 by a small square or any equivalent small area, the present invention includes a 16 input AND gate. Two such gates, designated 61 and 62, are shown in FIG. 3. The 16 inputs of each gate are connected to one stage of each of the 16 shift registers. The stages are selected so that when an impact occurs at the hit location with which the gate is associated at some time during the shifting of the registers, all of the stages store binary 1's, thereby enabling the gate to provide a hit-indicating output. These hit-indicating outputs may be accumulated in counters such as counters 63 and 64, shown connected to the outputs of the gates 61 and 62, respectively.

Assuming for example that gate 61 represents the hit location which hit H1, shown in FIG. 1, impacts in FIG. 1, in accordance with the invention, on the basis of the time-of-arrival chart forming FIG. 2 and assuming that the 0 stage of each register represents 0ms and the clock pulse period is one (1) msec., the inputs of gate 61 are connected to stages 2 of the registers 50F, 50G, 50J and 50K, to stages 6 of registers 50B, 50C, 50E, 50H, 50I, 50L, 50N and 50O, and to stages 8 of 50A, 50D, 50M, and 50P. Thus, in such an arrangement after hit H1 occurs, at some time in the operation of the system all of these stages will store binary 1's simultaneously, thereby enabling gate 61 to provide an output indicating a hit such as H1 in the hit location, associated with gate 61. In FIG. 3, the inputs of gate 61 are labeled by the register designations followed by subscripts which corresponds to their respective stages. Similarly, the inputs to gate 62 are labeled for a case in which gate 62 is assumed to be associated with the hit location in which hit H2 is assumed to lie.

It should be appreciated that the target discrimination resolution depends on the shifting rate. Resolution can be increased by increasing the shifting rate so that each clock pulse period corresponds to the time required for the energy to transverse a shorter distance, corresponding to the dimension of a smaller area or smaller hit location. In such a case longer shift registers and more AND gates are required, one gate per smaller hit location.

The only factor limiting resolution is the shifting speed of present state of the art shift registers, the duration of the impact pulse above the threshold, and the operational speeds of the AND gates and the counters. Since at present such devices have very high operational speeds, it is apparent that the system may be adjusted to any desired target discrimination resolution commensurate with the impact pulse duration. In any system however, the basic clock rate is adjusted to the time required for a radiated pulse or energy wave front to propagate across the desired resolution hit location of interest.

Although a particular embodiment of the invention has been described and illustrated herein, it is recognized that modifications and variations may readily occur to those skilled in the art and consequently it is intended that the claims be interpreted to cover such modifications and equivalents.

What is claimed is:

1. A system for determining the location of a source of energy in a defined area comprising:

a plurality of energy-sensitive detectors, arranged in a fixed array over said area;

a plurality of means including storing means coupled to said detectors for storing signals indicative of the sensing of energy by said detectors; and a separate gating means for each defined incremental location in said area coupled to said storing means for providing an output signal, only if energy from an energy source, located at the incremental area with which said separate gating means is associated, is received by said plurality of detectors in a predefined time relationship, which is a function of the distance of each detector from said incremental area and the propagation time of energy per unit distance, and said storing means comprise means associated with each detector for storing separate signals indicative of the arrival of energy at each detector during discrete separate time periods.

2. The arrangement as recited in claim 1 wherein each of said storing means comprises a multistage clockable shift register and said system includes means for clocking said shift registers at a clock rate which is a function of the energy propagation time over a distance related to the dimension of the incremental area of interest.

3. A system for detecting the locations of points of impacts of projectiles or the like with ground in a defined target area, each impact resulting in the propagation of energy through the ground outwardly from the point of impact, the system comprising:

a plurality of energy-sensitive detectors, arranged in a fixed array in the ground defining the target area, each detector providing an output signal when energy is sensed thereby;

first means including a separate signal storing means coupled to each detector for storing therein signals, corresponding to the output signals of the detector, as a function of the times of arrival of energy at said detector; and output means including a separate gating means for each point of impact of interest, said output means further including means for connecting each gating means to the signal storing means associated with said detectors as a function of the distances of said detectors from the point of impact, so that only when a projectile impacts said point of impact, said gating means provides an impact-indicating signal.

4. The arrangement as recited in claim 3 wherein each separate signal storing means comprises a clockable multistage shift register, each point of impact comprises an incremental area, said system further includes means for clocking said shift registers at a rate which is a function of the propagation of energy through said ground a distance corresponding to a dimension of said incremental area and the gating means associated with each incremental area is connected to a different set of stages of said shift register, the set including one stage of each shift register.

5. The arrangement as recited in claim 4 further including counting means coupled to at least some of said gating means for counting the impact-indicating signals produced thereby.

6. The arrangement as recited in claim 4 further including impact-indicating signal-counting means coupled to each gating means for counting the number of impact-indicating signals produced thereby.

7. The arrangement as recited in claim 4 wherein said first means further include a separate amplifying means and a separate signal threshold means for each detector interposed between the detector and its separate shift register for storing in the input stage of the shift register a binary signal of either a first level or a second level when the amplified amplitude of the detector's output signal is either above or below respectively of a threshold level controlled by said signal threshold means.

8. The arrangement as recited in claim 7 further including impact-indicating signal-counting means coupled to each gating means for counting the number of impact-indicating signals produced thereby and wherein each gating means is an AND gate having a plurality of inputs equal to the number of shift registers, with each input connected to one stage of each shift register.

* * * * *